(12) United States Patent
Zhang et al.

(10) Patent No.: US 8,468,437 B2
(45) Date of Patent: Jun. 18, 2013

(54) FILTERING METHOD, SYSTEM AND EQUIPMENT

(75) Inventors: Pengrui Zhang, Shenzhen (CN); Guozhu Long, Shenzhen (CN); Cheng Li, Chengdu (CN); Huishen Dong, Shenzhen (CN); Yuchen Jia, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/399,170

(22) Filed: Feb. 17, 2012

(65) Prior Publication Data

US 2012/0151305 A1   Jun. 14, 2012

Related U.S. Application Data

(63) Continuation of application No. PCT/CN2010/073109, filed on May 24, 2010.

(30) Foreign Application Priority Data

Sep. 23, 2009   (CN) .......................... 2009 1 0174223

(51) Int. Cl.
| | |
|---|---|
| *G06F 11/00* | (2006.01) |
| *H03M 13/03* | (2006.01) |
| *H03H 7/30* | (2006.01) |

(52) U.S. Cl.
USPC ........................... 714/799; 714/794; 375/232

(58) Field of Classification Search
USPC ........................................................ 714/799
See application file for complete search history.

(56) References Cited

U.S. PATENT DOCUMENTS

| | | | | |
|---|---|---|---|---|
| 6,665,349 | B1 * | 12/2003 | Cherubini et al. ............ | 375/261 |
| 7,778,314 | B2 * | 8/2010 | Wajcer et al. ................. | 375/220 |
| 8,027,409 | B2 * | 9/2011 | Aziz et al. ..................... | 375/316 |
| 8,041,233 | B2 * | 10/2011 | Hueda et al. .................. | 398/208 |
| 2009/0116582 | A1 | 5/2009 | Ashikhmin et al. | |
| 2009/0296836 | A1 | 12/2009 | Su | |
| 2011/0090978 | A1 | 4/2011 | Fang et al. | |
| 2011/0176594 | A1 | 7/2011 | Fang et al. | |

FOREIGN PATENT DOCUMENTS

| | | |
|---|---|---|
| CN | 1921464 A | 2/2007 |
| CN | 101155157 A | 4/2008 |
| CN | 101267421 A | 9/2008 |
| CN | 101286760 A | 10/2008 |

(Continued)

OTHER PUBLICATIONS

International Search Report dated Sep. 2, 2010 in connection with International Patent Application No. PCT/CN2010/073109.

(Continued)

*Primary Examiner* — James C Kerveros

(57) ABSTRACT

A filtering method, system, and equipment applied in digital communication technologies are disclosed in the embodiments of the present invention. The filtering method of the present embodiments includes: acquiring filtering coefficients of a part of all subcarriers according to data transmission errors; acquiring filtering coefficients of remaining subcarriers through an interpolation algorithm according to the filtering coefficients of the part of subcarriers; and finally, filtering the data corresponding to the multiple subcarriers according to the filtering coefficients of the part of subcarriers and the filtering coefficients of the remaining subcarriers. The part of subcarriers may be selected at a regular interval, or may be subcarriers which are located at a motion value away from the part of subcarriers selected in the previous update of the filtering coefficients. The method of the present embodiments reduces the amount of operation and hardware expenditure, and saves the cost.

9 Claims, 7 Drawing Sheets

FOREIGN PATENT DOCUMENTS

| | | |
|---|---|---|
| CN | 101610103 | 12/2009 |
| CN | 101674165 | 3/2010 |
| EP | 1 416 688 A1 | 5/2004 |
| EP | 2 043 316 A1 | 4/2009 |
| EP | 2 282 409 | 2/2011 |

OTHER PUBLICATIONS

Written Opinion dated Sep. 2, 2010 in connection with International Patent Application No. PCT/CN2010/073109.

European Search dated Apr. 23, 2012 in connection with EP Patent Application 10818290.8.

Louveaux, J, et al; "Error Sign Feedback as an Alternative to Pilots for the Tracking of FEXT Transfer Functions in Downstream VDSL" EURASIP Journal of Applied Signal Processing, vol. 2006, Article ID 94105, Aug. 22, 2005, 14 pages.

Office Action dated Nov. 2, 2012 in connection with EP Patent Application No. 10818290.8, 6 pages.

Search Report dated Dec. 3, 2012 in connection with Chinese Patent Application No. 2009101742239.

* cited by examiner

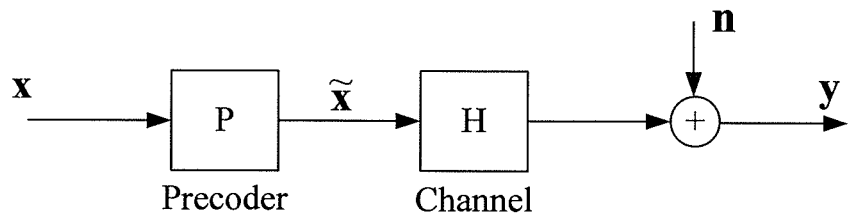

FIG. 3

| Acquire filtering coefficients of the data over the corresponding subcarriers according to the data transmission errors of the data over the part of subcarriers | 10 |

| Acquire filtering coefficients of the data over the remaining subcarriers through an interpolation algorithm according to the filtering coefficients of the data over the part of subcarriers | 20 |

| Filter the data over the corresponding subcarriers according to the filtering coefficients of the data over the part of subcarriers and the filtering coefficients of the data over the remaining subcarriers | 30 |

FIG. 4

FILTERING METHOD, SYSTEM AND EQUIPMENT

CROSS-REFERENCE TO RELATED APPLICATIONS

This application is a continuation of International Application No. PCT/CN2010/073109, filed on May 24, 2010, which claims priority to Chinese Patent Application No. 200910174223.9, filed with the Chinese Patent Office on Sep. 23, 2009 and entitled "FILTERING METHOD, SYSTEM AND EQUIPMENT", both of which are hereby incorporated by reference in their entireties.

TECHNICAL FIELD

The present invention relates to digital communication technologies, and in particular, to a filtering method, system, and equipment.

BACKGROUND

Digital Subscriber Line (xDSL) is a high-speed data transmission technology, and occupies high band. Crosstalk is increasingly noticeable in the xDSL, and Far End Crosstalk (FEXT) affects transmission performance of the line drastically. As shown in FIG. 1, when multiple lines in a bundle of cables need to activate the xDSL service, there will be crosstalk, and the FEXT makes some lines suffer a low rate, unstable performance, and even failure of service activation, which ends in a low line activation rate of the Digital Subscriber Line Access Multiplexer (DSLAM).

In the prior art, the primary means of canceling the FEXT is signal processing, which stabilizes the line performance. As shown in FIG. 2, in the uplink transmission direction (namely, the signal is transmitted from the Customer Premises Equipment (CPE) to the central office), the data transmitted from the CPE passes through the channel H, and then a noise vector n is overlaid to the data. The data y received at the central office undergoes joint crosstalk cancelation performed by a filtering canceller W to ensure that the user data received at the CPE is free from crosstalk. The signal finally acquired by the central office is $\hat{y}=WHx+Wn$. When WH is a diagonal matrix, the crosstalk is eliminated. As shown in FIG. 3, in the downlink transmission direction (namely, the signal is transmitted from the central office or far end to the CPE), a precoder P at the CPE preprocesses the data x to be transmitted, the preprocessed data passes through the channel H, and then a noise vector n is overlaid to the data. The data received at the central office or far end is free from crosstalk. Therefore, the signal finally acquired by the CPE is $\hat{y}=HPx+n$. When HP is a diagonal matrix, the crosstalk is eliminated. The above channel H is an M×M channel transmission matrix, and n is an M×1 noise vector.

In a practical implementation scheme, the central office or far end trains and updates the coefficient of the precoder according to data transmission errors fed back by the CPE to make the HP be a diagonal matrix. The formula for updating the coefficient is $P_k=P_k+u^*E_k^*X_k^H$, where P is the precoding coefficient of the subcarrier numbered k (namely, subcarrier k), u is the update step length, and $E_k=Y_k-X_k$ represents the data transmission error of subcarrier k. Also, the central office trains and updates the coefficient of the canceller according to the data transmission errors to make WH be a diagonal matrix.

In the software and hardware implementation of the precoder and the canceller, the precoding and the cancellation are based on each subcarrier separately. That is, the filtering is performed after the filtering coefficient of each subcarrier is acquired according to the data transmission errors. Generally, there are many subcarriers need to subject to crosstalk cancelation, which involves very large amount of operation, consumes hardware resources and operation time drastically, and increases the cost.

SUMMARY

The embodiments of the present invention provide a filtering method, system, and equipment.

A filtering method provided in an embodiment of the present invention includes:

acquiring data transmission errors of data over a part of multiple subcarriers between a first communication equipment and a second communication equipment;

acquiring filtering coefficients of the part of subcarriers according to the data transmission errors of the data over the part of subcarriers;

acquiring filtering coefficients of remaining subcarriers according to the filtering coefficients of the part of subcarriers; and filtering data corresponding to the multiple subcarriers according to the filtering coefficients of the part of subcarriers and the filtering coefficients of the remaining subcarriers.

A communication equipment provided in an embodiment of the present invention includes:

a first acquiring unit, configured to acquire data transmission errors of data over a part of multiple subcarriers between the communication equipment and a second communication equipment, and acquire filtering coefficients of the part of subcarriers according to the data transmission errors of the data over the part of subcarriers;

a second acquiring unit, configured to acquire filtering coefficients of remaining subcarriers according to the filtering coefficients of the part of subcarriers acquired by the first acquiring unit; and a filtering unit, configured to filter data corresponding to the multiple subcarriers according to the filtering coefficients of the part of subcarriers acquired by the first acquiring unit and the filtering coefficients of the remaining subcarriers acquired by the second acquiring unit.

A communication system provided in an embodiment of the present invention includes:

a first communication equipment, configured to acquire filtering coefficients of a part of multiple subcarriers according to data transmission errors of the part of subcarriers; acquire filtering coefficients of remaining subcarriers according to the filtering coefficients of the part of subcarriers; and filter data corresponding to the multiple subcarriers according to the filtering coefficients of the part of subcarriers and the filtering coefficients of the remaining subcarriers.

Therefore, the filtering method in the embodiments of the present invention is: acquiring filtering coefficients of a part of all subcarriers according to data transmission errors, using an interpolation algorithm to acquire filtering coefficients of remaining subcarriers according to the filtering coefficients of the part of subcarriers, and finally, filtering data corresponding to the multiple subcarriers according to the filtering coefficients of the part of subcarriers and the filtering coefficients of the remaining subcarriers. The part of subcarriers may be selected at a regular interval, or may be the subcarriers which are located at a motion value away from the part of subcarriers selected in the previous update of the filtering coefficient. Compared with the prior art which needs to acquire the filtering coefficients of all subcarriers according to the data transmission errors and perform filtering, the method provided by the embodiments of the present invention reduces the amount of operation and hardware expenditure, and saves the cost.

BRIEF DESCRIPTION OF THE DRAWINGS

To make the technical solution in the embodiments of the present invention or in the prior art clearer, the following outlines the accompanying drawings involved in the description of the embodiments of the present invention or the prior art. Apparently, the accompanying drawings outlined below are merely some embodiments of the present invention, and persons of ordinary skill in the art can derive other drawings from them without any creative effort.

FIG. 3 is a logical schematic structural diagram of cancelling FEXT through a precoder in the prior art;

FIG. 4 is a flowchart of a filtering method according to an embodiment of the present invention;

DETAILED DESCRIPTION

Figure 1:
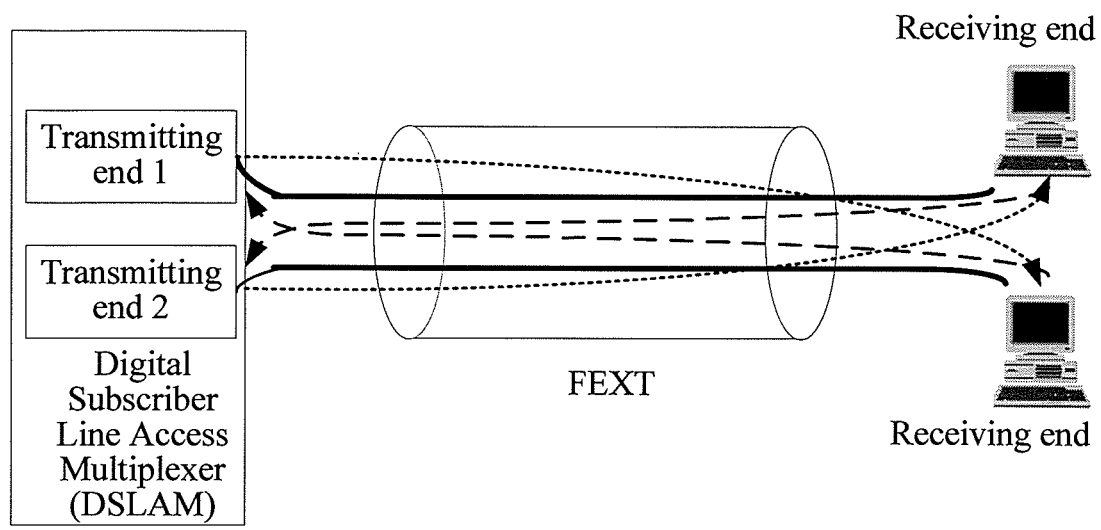
FIG. 1 is a schematic structural diagram of FEXT in the prior art.
Figure 2:
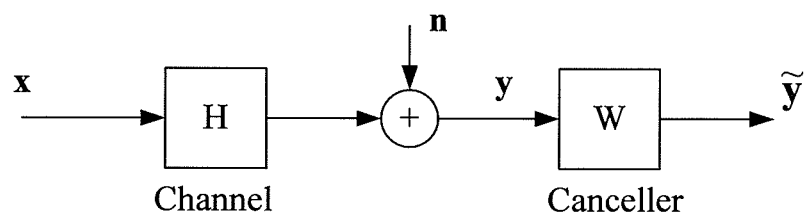
FIG. 2 is a logical schematic structural diagram of cancelling FEXT through a canceller in the prior art.

The following detailed description is given in conjunction with the accompanying drawings to provide a clear, thorough description of the technical solution in the embodiments of the present invention. Evidently, the described embodiments are merely a part of the embodiments of the present invention rather than all embodiments. All other embodiments, which can be derived by those ordinary skilled in the art from the embodiments given herein without any creative effort, shall fall within the protection scope of the present invention.

The method embodiments of the present invention provide a filtering method, which is primarily applied in a communication system of multi-carrier modulation between two communication equipments, for example, xDSL transmission system. The method may be a filtering method which precodes data sent by a first communication equipment to a second communication equipment, or a filtering method which cancels FEXT of the data received by the first communication equipment from the second communication equipment. The first communication equipment may be a DSLAM in a central office, and the second communication equipment may be a CPE.

As shown in FIG. 4, the method provided in this embodiment includes the following steps:

Step 10: Acquire data transmission errors of data over a part of multiple subcarriers between the first communication equipment and the second communication equipment, and acquire a filtering coefficient of each subcarrier in the part of subcarriers according to the data transmission errors of the data over the part of subcarriers.

The multiple subcarriers between the first communication equipment and the second communication equipment refer to all subcarriers used for communication between them, and are designated by the equipments before the communication.

In the method procedure in an embodiment of the present invention, at the time of filtering (such as precoding) for the transmitting end of the first communication equipment, the data over a part of subcarriers is the data sent by the first communication equipment to the second communication equipment, and, in this case, the filtering coefficient refers to a precoding coefficient; at the time of filtering for the receiving end of the first communication equipment, the data over a part of subcarriers is the data received by the first communication equipment from the second communication equipment, and, in this case, the filtering coefficient refers to a cancellation coefficient.

It is understood that at the time of acquiring the filtering coefficients of a part of subcarriers, the filtering coefficient of each subcarrier is acquired according to the data transmission error of the data over this subcarrier. After the data transmission error is acquired, the filtering coefficient of the corresponding subcarrier can be acquired according to a coefficient update formula in the Least Mean Square (LMS) algorithm, linear zero forcing method, Singular Value Decomposition (SVD) method or QR decomposition method, etc. For example, if the LMS algorithm is applied, the precoding coefficient update formula is $P_k=P_k+u*E_k*X_k^H$, where $E_k$ is the data transmission error of subcarrier k.

It is shall be noted that, in this step, the first communication equipment may decide the subcarriers whose filtering coefficients need to be acquired according to its preset information; or, before this step, the first communication equipment selects a part of subcarriers according to its preset policies, and acquires the filtering coefficients of the selected subcarriers. The preset policies include: selecting subcarriers at an interval of N (N>0) subcarriers; according to a first preset condition, selecting subcarriers which are located at a motion value away from the part of subcarriers selected in the previous update of the filtering coefficients, where the motion value may be $(1/2^n)*N$ (where n is a positive integer), and the motion value is an integer.

The first condition may includes: the motion value increases when the crosstalk channel changes less with frequency, for example, the motion value is greater than a preset value K (such as 64) when the amplitude change of the crosstalk channel of multiple (such as 10) continuous subcarriers is less than a preset value (such as less than 5%); the motion value decreases when the crosstalk channel changes sharply with frequency, for example, the motion value is less than a preset value P (such as 32) when the amplitude change of the crosstalk channel of multiple (such as 10) continuous subcarriers is greater than a preset value (such as greater than 10%); and other preset policies may also be possible.

Step 20: Acquire filtering coefficients of remaining subcarriers according to the filtering coefficients of the part of subcarriers.

At the time of acquiring, the acquired filtering coefficients of the part of subcarriers may act as known quantity, and a linear interpolation method or nonlinear interpolation method is applied, namely, the filtering coefficients of subcarriers between two adjacent subcarriers among the part of subcarriers are used as a linear sequence or nonlinear sequence in the calculation.

Step 30: Filter data corresponding to the subcarriers according to the filtering coefficients of the part of subcarriers and the filtering coefficients of the remaining subcarriers.

After the filtering coefficient of every subcarrier is acquired according to the method in step 20 and step 10, the filter updates the corresponding filtering coefficients and filters the data corresponding to the multiple subcarriers.

It is understood that, the first communication equipment will keep on acquiring the filtering coefficient of a part of subcarriers according to the data transmission errors and acquiring the filtering coefficient of the remaining subcarriers until a second condition preset locally is satisfied. The second condition may be: filtering coefficient of each subcarrier reaches a preset value, or the product of the filtering coefficient and the channel H is a diagonal matrix or is almost a diagonal matrix, namely, HP or WH is a diagonal matrix or is almost a diagonal matrix. Acquiring the filtering coefficient of the part of subcarriers, then acquiring the filtering coefficient of the remaining subcarrier, and updating the filtering coefficients of the filter with the filtering coefficients of all subcarriers is called filtering coefficient update.

In each update of the filtering coefficients, a part of the subcarriers may be selected according to actual conditions and the selection principles may be the same or different; and are selected based on the above preset policies. For example, the selection principle is: among all local subcarriers, selecting the subcarriers which are located at a motion value away from the part of subcarriers selected in the previous update of the filtering coefficients; or, selecting subcarriers at an interval of N (N>0) subcarriers.

The filtering method, system, and equipment in the embodiments of the present invention are described below with reference to practical embodiments.

Method Embodiment 1

Figure 5:
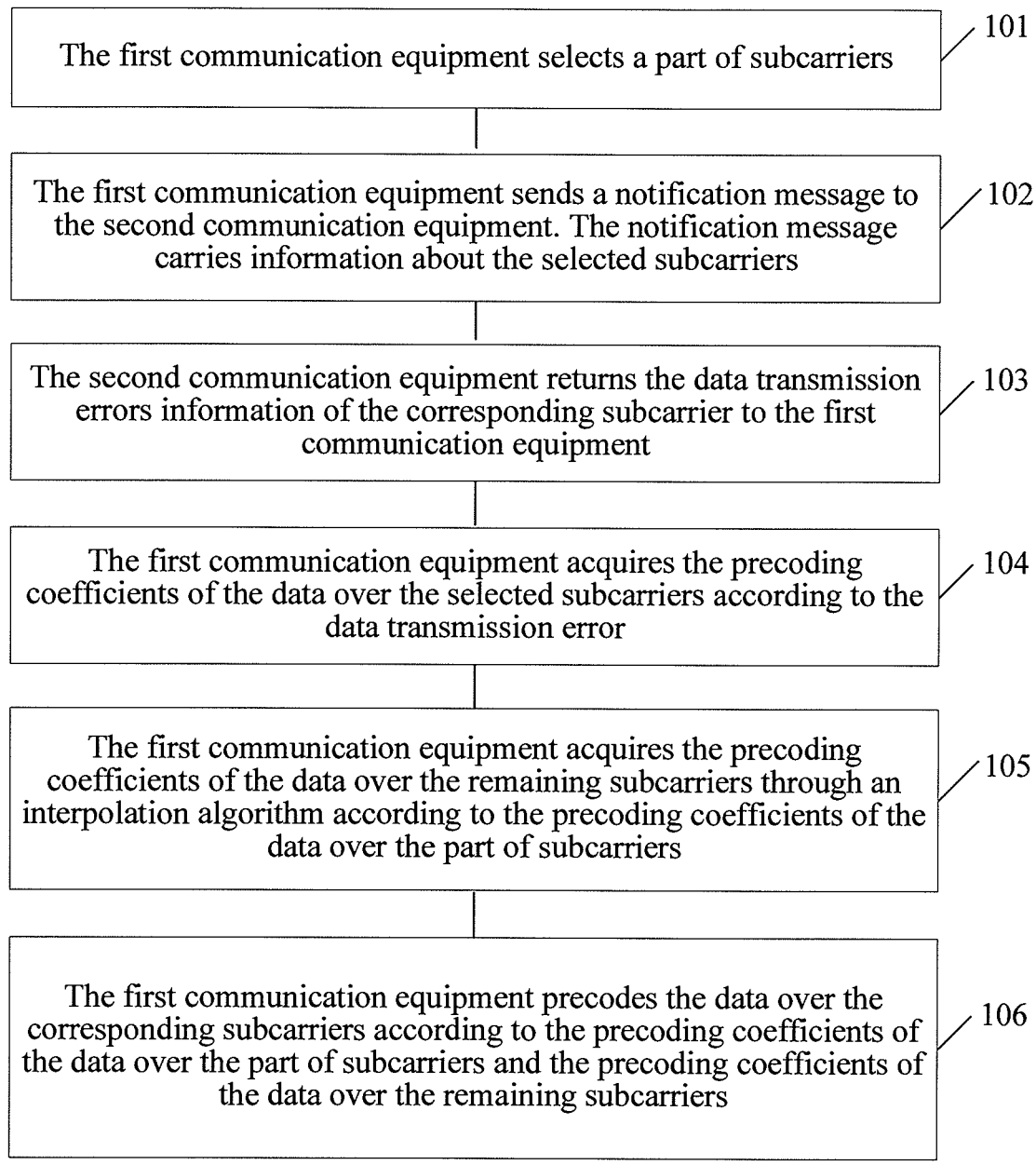
FIG. 5 is a flowchart of a filtering method according to a first method embodiment of the present invention.

A filtering method is provided in this embodiment. Supposing that the filtering coefficient is a precoding coefficient of the precoder, as shown in FIG. 5, the method includes the following steps:

Step 101: The first communication equipment selects a part of subcarriers.

In this embodiment, the method of selecting a part of subcarriers is: among all subcarriers, selecting subcarriers at an interval of N subcarriers, for example, selecting subcarrier 1, subcarrier 1+N, . . . , subcarrier k*N+1, and so on.

Step 102: The first communication equipment sends a notification message to the second communication equipment. The notification message comprises information about the selected subcarriers.

The information about the subcarriers may be locations of the subcarriers selected in step 101 or the interval N for selecting the subcarriers.

Step 103: The second communication equipment returns the data transmission errors of the corresponding subcarrier to the first communication equipment.

After receiving the notification message, according to the locations of the subcarriers or the interval N indicated in the notification message, the second communication equipment detects the sequence of data corresponding to the multiple subcarriers at the time of sending the data from the first communication equipment, and uses an error calculation formula $E_k = Y_k - X_k$ to acquire the data transmission errors, where $Y_k$ represents the sequence of data over subcarrier k in the data received by the second communication equipment, and $X_k$ represents the sequence of this data at the time of sending this data from the transmitting end.

Step 104: The first communication equipment acquires the precoding coefficients of the data over the selected subcarriers according to the data transmission errors.

The first communication equipment may use a coefficient update formula to acquire the precoding coefficients of the data over the selected subcarriers.

Step 105: The first communication equipment acquires the precoding coefficients of the data over the remaining subcarriers according to the precoding coefficients of the data over the part of subcarriers.

It is understood that, since the characteristics of the adjacent subcarrier channels are similar. Therefore, the method of acquiring the precoding coefficients may be: acquiring the precoding coefficients (including amplitude and phase information) of the part of subcarriers, and then acquiring the precoding coefficients of the remaining subcarriers by means of linear interpolation or nonlinear interpolation; or, acquiring the precoding coefficients (amplitude and phase) of the remaining subcarriers respectively according to the amplitude and phase of the precoding coefficients of the part of subcarriers, and then acquiring the precoding coefficients of all subcarriers.

For example, assuming that the precoding coefficients of subcarrier k and k+N+1 acquired in step 104 are $P_k$ and $P_{k+N+1}$ respectively, the process of acquiring the precoding coefficients of the subcarriers between k and k+N+1 through linear interpolation is as follows. Acquire values of $P_k$ and $P_{k+N+1}$, and then calculate the mean deviation $\Delta P$ between $P_k$ and $P_{k+N+1}$, where $$\Delta P = \frac{P_{mn,k+N+1} - P_{mn,k}}{N+1}.$$

Therefore, $P_{k+1} = \Delta P + P_k$, $P_{k+2} = \Delta P + P_{k+1}$, $P_{k+N} = \Delta P + P_{K+N-1}$, and so on. In this embodiment, the precoding coefficients of the selected subcarriers between k and k+N+1 are regarded as a linear sequence, and the precoding coefficients of the remaining subcarriers are acquired through linear interpolation; or, the precoding coefficients of the subcarriers between k and k+N+1 may also be regarded as a nonlinear sequence, and the precoding coefficients of the remaining subcarriers are acquired through nonlinear interpolation.

Compared with the prior art which needs to acquire the precoding coefficient of every subcarrier according to the data transmission error, the method in this embodiment reduces the amount of operation and hardware expenditure.

Step 106: The first communication equipment precodes the data corresponding to the multiple subcarriers according to the precoding coefficients of the part of subcarriers and the filtering coefficients of the remaining subcarriers.

Figure 6A:
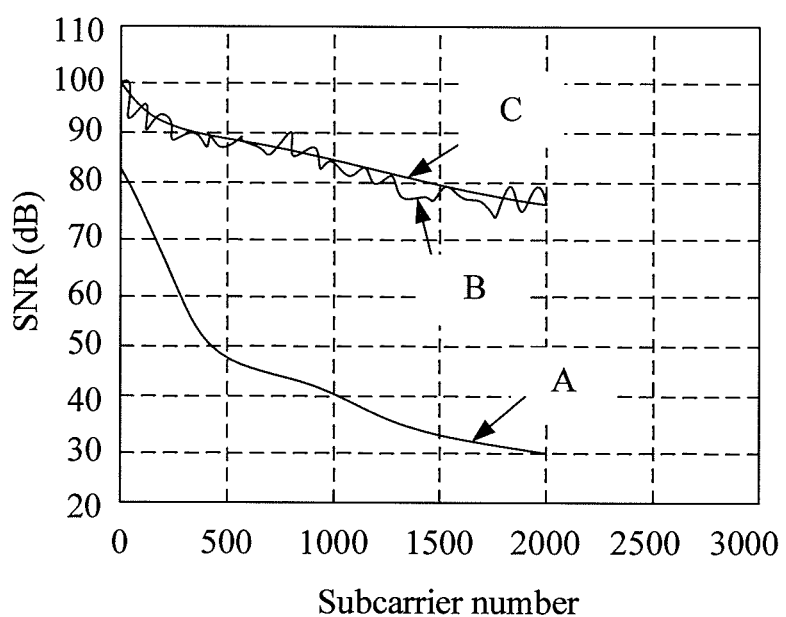
FIG. 6a shows comparison of SNR after filtering according to a first method embodiment of the present invention and according to the prior art.
Figure 6B:
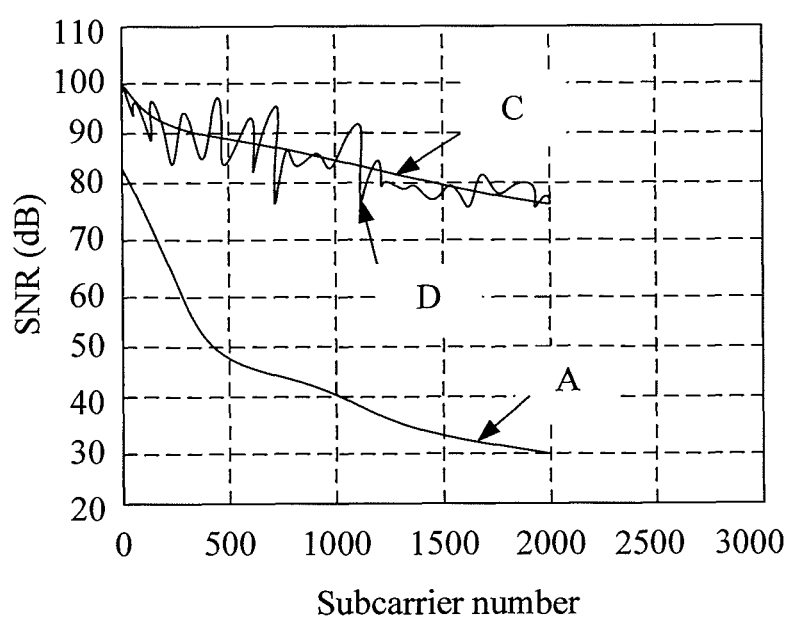
FIG. 6b shows another comparison of SNR after filtering according to a first method embodiment of the present invention and according to the prior art.

As shown in FIG. 6a and FIG. 6b, curve A represents the Signal-to-Noise Ratio (SNR) in the case that the data over the subcarrier is not precoded; curve B represents the SNR after the data over the subcarrier is precoded according to the method disclosed in this embodiment, where N is 20; curve C represents the SNR after the data over the subcarrier is precoded according to the prior art; and curve D represents the SNR after the data over the subcarrier is precoded according to the method disclosed in this embodiment, where N is 40. Compared with the precoding performed according to the prior art, the method in this embodiment relieves performance deterioration, reduces the amount of operation, and the amount of operation and the hardware expenditure decreases massively with the rising of N.

If the filtering coefficient is a cancellation coefficient of the canceller, the implementation method is similar to the scenario in which the filtering coefficient is a precoding coefficient except that: the first communication equipment does not need to notify information of the selected subcarriers to the second communication equipment after selecting a part of subcarriers, because the filtering occurs on the receiving end of the first communication equipment, and the first communication equipment can acquire the data transmission error corresponding to each subcarrier by itself and calculate the cancellation coefficient.

With respect to the amount of operation, the method in the prior art involves $2K^2N$ multiplication operations, but the method in this embodiment involves only $5K^2$ multiplication operations, where K is the number of users, and N is the number of subcarriers.

Compared with the prior art which needs to acquire the precoding coefficients of all local subcarriers according to the data transmission errors and perform filtering, the method provided by this embodiment of the present invention reduces the amount of operation, saves hardware expenditure, and cuts down the cost.

Method Embodiment 2

Figure 7:
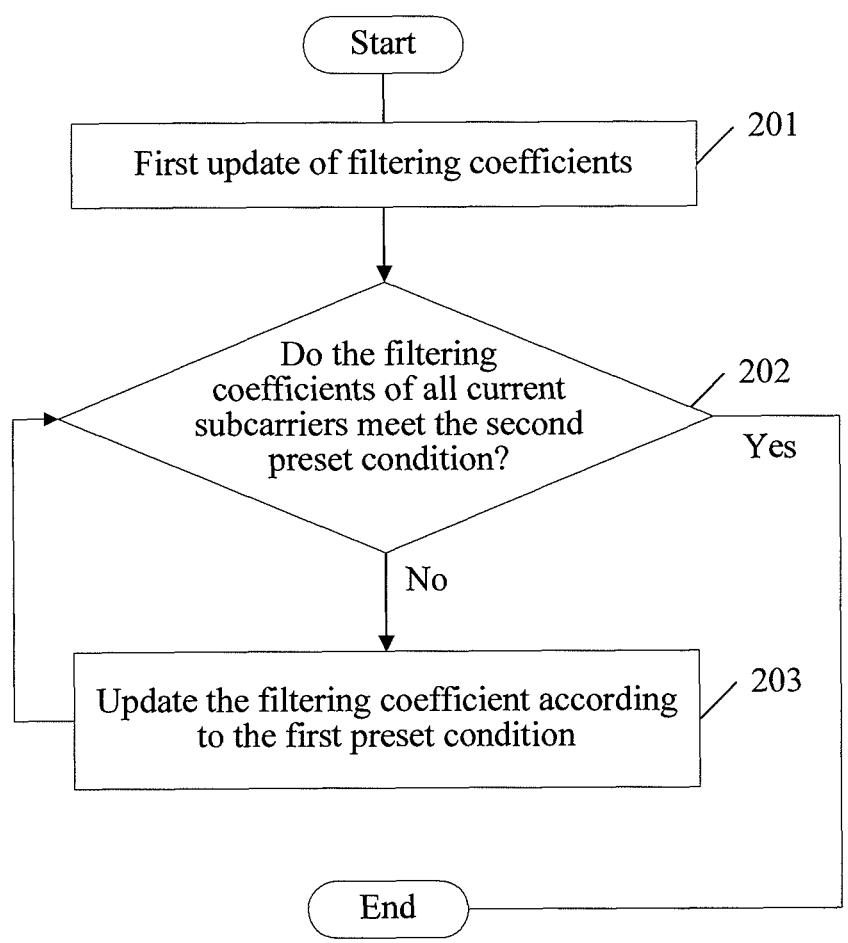
FIG. 7 is a flowchart of a filtering method according to a second method embodiment of the present invention.

A filtering method is provided in this embodiment. In this embodiment, the entity for performing the method may be a first communication equipment, the flowchart is shown in FIG. 7, the method includes the following steps:

Step 201: Update the filtering coefficient for the first time.

Acquire the data transmission errors of the data over a part of multiple subcarriers through an LMS method. Among all subcarriers for communication between the first communication equipment and the second communication equipment, select subcarriers at an interval of N subcarriers, and acquire filtering coefficients of corresponding subcarriers according to the data transmission errors of the data over the selected subcarriers. Acquire the filtering coefficients of the remaining subcarriers by means of linear interpolation or nonlinear interpolation, and filter the data corresponding to the multiple subcarriers according to the filtering coefficients of the selected subcarriers and the remaining subcarriers.

The filtering coefficient of a subcarrier may be updated subsequently again after acquire the filtering coefficient of the subcarrier according to the data transmission errors in the later update of the filtering coefficient.

Figure 8:
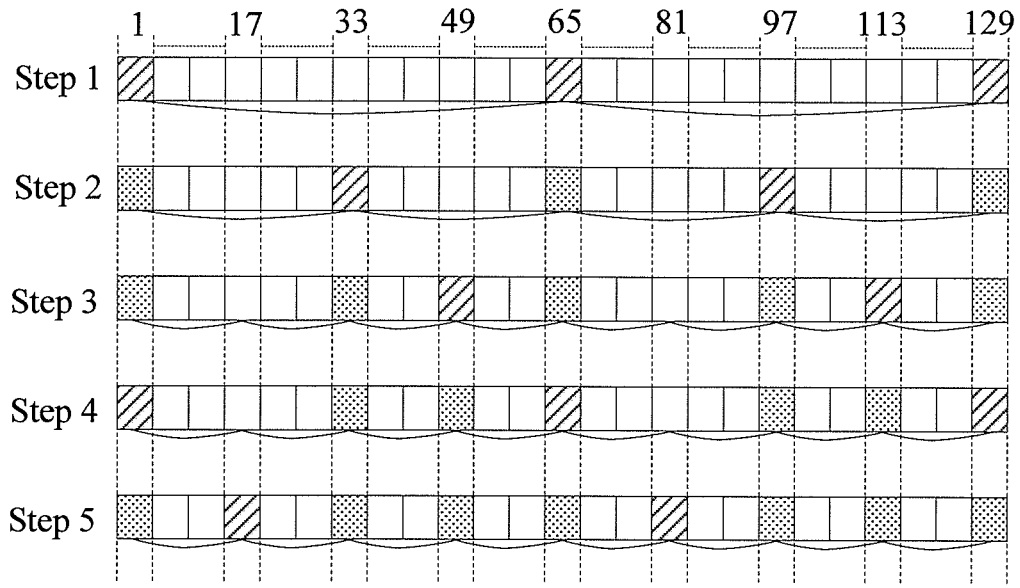
FIG. 8 is a distribution diagram of subcarriers corresponding to a filtering coefficient calculated in a second method embodiment of the present invention.

As shown in FIG. 8, supposing that N is 64, and the blocks numbered 1, 17, ..., and 129 in FIG. 8 indicate the locations of subcarriers. In Step 1 in FIG. 8, the blocks filled with oblique lines indicate the locations of the subcarriers selected in this step, and are referred to known points such as 1, 65, ..., and 129.

Step 202: Judge whether the filtering coefficients of all current subcarriers meet the second preset condition. If not, proceed to step 203; if so, end the procedure.

The second preset condition may be: The filtering coefficients of all subcarriers reach a preset value; or, the product of the filtering coefficient and the channel H is a diagonal matrix or almost a diagonal matrix, namely, HP or WH is a diagonal matrix or almost a diagonal matrix; or, the filtering coefficient meets a convergence condition.

Step 203: Update the filtering coefficient according to the first preset condition, and proceed to step 202.

The first condition may be: The motion value is greater than a preset value K when the crosstalk channel changes within a certain range with frequency, and the motion value is less than the preset value when the crosstalk channel changes sharply with frequency; and other preset policies may also be possible.

Specifically, at the time of updating the filtering coefficient, the selected subcarriers are the subcarriers located at a motion value away from the part of subcarriers selected in the previous update of the filtering coefficients, where the motion value may be $(½n)*N$ (n is a positive integer), and the motion value is an integer.

The following exemplifies the second update of the filtering coefficients and the third update of the filtering coefficients.

Method for the second update of the filtering coefficients: Select first subcarriers located at a motion value away from the subcarriers selected in the first update of the filtering coefficients (the blocks filled with oblique lines in step 2 in FIG. 8 are the locations of the first subcarriers selected when the motion value is 32, i.e., points numbered 33, 97, and so on; the blocks filled with dots are the locations of the subcarriers selected in the previous update of the filtering coefficients); acquire filtering coefficients of the data over the remaining subcarriers through linear interpolation or nonlinear interpolation according to the filtering coefficients of the first subcarriers and the filtering coefficients of the subcarriers selected in the previous update of filtering coefficients; and filter the data corresponding to the multiple subcarriers according to the filtering coefficients of the first subcarriers and the filtering coefficients of the remaining subcarriers.

Method for the third update of the filtering coefficients: Select second subcarriers located at another motion value away from the first subcarriers selected in the second update of the filtering coefficients (step 3 in FIG. 8 shows the locations of the second subcarriers selected when the motion value is 16, i.e., the points numbered 49, 113, and so on); acquire filtering coefficients of the second subcarriers according to the data transmission errors of the second subcarriers; acquire filtering coefficients of the remaining subcarriers through linear interpolation or nonlinear interpolation according to the filtering coefficients of the second subcarriers, the filtering coefficients of the subcarriers selected in the first update of filtering coefficients, and the filtering coefficients of the first subcarriers; and filter the data corresponding to the multiple subcarriers according to the filtering coefficients of the second subcarriers and the filtering coefficients of the remaining subcarriers.

The fourth update of the filtering coefficients and subsequent update of the filtering coefficients are similar. Whenever the filtering coefficients of the subcarriers are acquired, it is necessary to filter the data over all subcarriers used for communication and perform step 202 until the filtering coefficients of all current subcarriers meet the second preset condition.

Notice that the filtering coefficient in this embodiment is a precoding coefficient of the precoder or a cancellation coefficient of the canceller, and the entity for performing the method is the first communication equipment. If the filtering coefficient is a precoding coefficient, at the time of acquiring precoding coefficients, the first communication equipment needs to notify the information about the selected subcarriers (such as motion value, and interval N) to the second communication equipment that receives data, and when receives the data transmission errors from the second communication equipment, acquires the precoding coefficients according to a precoding coefficient update formula; if the filtering coefficient is a cancellation coefficient, at the time of acquiring the cancellation coefficient, the first communication equipment acquires the data transmission errors locally, and then acquires the cancellation coefficients according to a cancellation coefficient update formula.

Evidently, when the first communication equipment selects a part of subcarriers, the part of subcarriers include the first subcarriers and the second subcarriers, and the remaining subcarriers are a result of subtracting the first subcarriers and the second subcarriers from all the subcarriers. At least one different subcarrier exists between the first subcarriers and the second subcarriers.

The first subcarriers and the second subcarriers may be selected in a manner of rotation training. The second subcarriers are located at a motion value away from the first carriers, and the motion value is $(\frac{1}{2}^n)*N$.

In this embodiment, after selecting the part of subcarriers, the first communication equipment acquires the filtering coefficients of the part of subcarriers according to the data transmission errors. By updating the filtering coefficients, the first communication equipment may filter the data over the subcarriers according to actual conditions. This process reduces the amount of operation significantly, relieves performance deterioration, and makes the calculation flexible.

Equipment Embodiment

Figure 9:
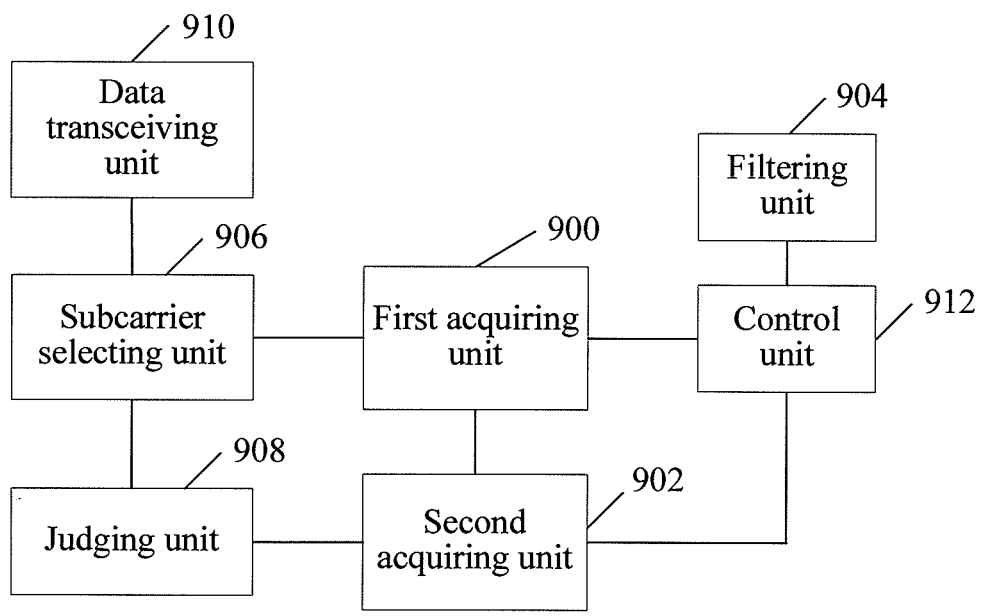
FIG. 9 is a schematic structural diagram of a communication equipment according to an equipment embodiment of the present invention.

A communication equipment is provided in this embodiment. The schematic structural diagram is shown in FIG. 9, the communication equipment includes:

a first acquiring unit 900, configured to acquire data transmission errors of data over a part of multiple subcarriers between the communication equipment and a second communication equipment, and acquire filtering coefficients of the data corresponding to the multiple subcarriers according to the data transmission errors of the data over the part of subcarriers;

a second acquiring unit 902, configured to acquire filtering coefficients of remaining subcarriers according to the filtering coefficients of the part of subcarriers acquired by the first acquiring unit 900; and a filtering unit 904, configured to filter data corresponding to the multiple subcarriers according to the filtering coefficients of the part of subcarriers acquired by the first acquiring unit 900 and the filtering coefficients of the remaining subcarriers acquired by the second acquiring unit 902.

The filtering unit 904 may be a precoder or canceller.

The communication equipment provided by this embodiment may further includes a subcarrier selecting unit 906, which is configured to select a part of subcarriers, and the first acquiring unit 900 acquires the filtering coefficients of the selected subcarriers.

In each update of the filtering coefficients, the subcarrier selecting unit 906 may select a part of subcarriers according to actual conditions. The selection principles may be the same or different. For example, the selection principle is: among all local subcarriers, selecting the subcarriers which are located at a motion value away from the part of subcarriers selected in the previous update of the filtering coefficients; or, selecting subcarriers at an interval of N (N>0) subcarriers.

The communication equipment provided in this embodiment may further includes a judging unit 908, a control unit 912, and a data transceiving unit 910.

The judging unit 908 is configured to judge whether the filtering coefficients acquired by the first acquiring unit 900 and the second acquiring unit 902 meet the preset second condition. The preset second condition may be: The data over each subcarrier reaches a preset value; or, the product of the filtering coefficient and the channel H is a diagonal matrix or almost a diagonal matrix.

The control unit 912 is configured to control the filtering unit 904 to filter the data according to the filtering coefficients acquired by the first acquiring unit 900 and the filtering coefficients acquired by the second acquiring unit 902.

The data transceiving unit 910 is configured to: send a notification message to the second communication equipment, where the notification message carries information about the subcarriers selected by the subcarrier selecting unit 906; and receive the data transmission errors returned by the second communication equipment.

The data transceiving unit 910 is further configured to perform Fast Fourier Transformation (FFT) for the data.

Compared with the communication equipment according to the prior art which needs to acquire the filtering coefficients of all subcarriers according to the data transmission error and perform filtering, the communication equipment provided by this embodiment reduces the amount of operation and hardware expenditure, and saves the cost.

System Embodiment

A communication system is provided in the embodiments of the present invention, which includes a first communication equipment.

The first communication equipment is configured to: acquire filtering coefficients of a part of multiple subcarriers according to data transmission errors of the data over the part of subcarriers, acquire filtering coefficients of remaining subcarriers through an interpolation algorithm after acquiring the filtering coefficients of the part of subcarriers, and filter the data corresponding to the multiple subcarriers according to the filtering coefficients of the part of subcarriers and the filtering coefficients of the remaining subcarriers.

In another embodiment, the first communication equipment is further configured to: select a part of subcarriers, and send a notification message that carries information about the selected subcarriers to a second communication equipment, and the second communication equipment is configured to receive the notification message from the first communication equipment, and return the data transmission errors of the corresponding subcarriers to the first communication equipment according to the information about the selected subcarriers.

The first communication equipment receives the data transmission errors returned by the second communication equipment, and acquires the precoding coefficients of a part of multiple subcarriers according to the data transmission errors; uses a linear interpolation method or a nonlinear interpolation method to acquire precoding coefficients of remaining subcarriers according to the precoding coefficients of the part of subcarriers, and precodes the data corresponding to the multiple subcarriers according to the precoding coefficients of the part of subcarriers and the precoding coefficients of the remaining subcarriers.

Therefore, the filtering method provided by the embodiments of the present invention is: acquiring filtering coefficients of a part of multiple subcarriers according to data transmission errors; using an interpolation algorithm to acquire filtering coefficients of remaining subcarriers according to the filtering coefficients of the part of subcarriers; and finally, filtering data corresponding to the multiple subcarriers according to the filtering coefficients of the part of subcarriers and the filtering coefficients of the remaining subcarriers. The part of subcarriers may be selected at a regular interval, or may be the selected subcarriers which are located at a motion value away from a part of subcarriers in the previous update of the filtering coefficient. Compared with the prior art which needs to acquire the filtering coefficients of all subcarriers according to the data transmission errors and perform filtering, the method provided by the embodiments of the present invention reduces the amount of operation and hardware expenditure, and saves the cost.

Persons of ordinary skill in the art should understand that all or part of the steps of the method in the above embodiments may be implemented by a program instructing relevant hardware. The program may be stored in computer readable storage media. The storage media may be a Read-Only Memory (ROM), Random Access Memory (RAM), magnetic disk or compact disk, etc.

Detailed disclosed above are a filtering method, system, and equipment provided by the embodiments of the present invention. Although the principle and implement of the present invention are described through some exemplary embodiments, the description of the above embodiments are served only to help the understanding of the method and core concept of the present invention. Also, those skilled in the art can make modifications and variations to the invention according to concept of the invention. As above mentioned, this description shall not be considered as a limit to this invention.

What is claimed is:

1. A filtering method, comprising:
    acquiring data transmission errors of data over a part of multiple subcarriers between a first communication equipment and a second communication equipment; wherein the part of multiple subcarriers each are selected at an interval of N subcarriers;
    acquiring filtering coefficients of the part of subcarriers according to the data transmission errors of the data over the part of subcarriers with a coefficient update formula in one of a Least Mean Square (LMS) algorithm, a linear zero forcing method, a Singular Value Decomposition (SVD) method, or a QR decomposition method; wherein the filtering coefficient of each subcarrier is acquired according to the data transmission error of the data over the subcarrier;
    acquiring filtering coefficients of remaining subcarriers according to the filtering coefficients of the part of subcarriers; wherein the remaining subcarriers are other subcarriers except the part of multiple subcarriers among all subcarriers between the first communication equipment and the second communication equipment;
    filtering data corresponding to the multiple subcarriers according to the filtering coefficients of the part of subcarriers and the filtering coefficients of the remaining subcarriers;
    determining, by the first communication equipment, whether the filtering coefficients corresponding to the multiple subcarriers meet a preset condition; if not, selecting first subcarriers which are located a motion value away from the part of subcarriers; wherein the motion value is $(\frac{1}{2}^n)*N$ and wherein N and n are integers greater than 0;
    acquiring, by the first communication equipment, the filtering coefficients of the first subcarriers according to the data transmission error of the data over the first subcarriers;
    acquiring, by the first communication equipment, according to the filtering coefficients of the part of subcarriers and the filtering coefficients of the first subcarriers, filtering coefficients of remaining subcarriers, wherein the remaining subcarriers are a result of subtracting the first subcarriers and the part of subcarriers from all the multiple subcarriers; and
    filtering, by the first communication equipment, the data corresponding to the multiple subcarriers according to the filtering coefficients of the first subcarriers and the filtering coefficients of the remaining subcarriers, wherein the remaining subcarriers are the result of subtracting the first subcarriers and the part of subcarriers from all the multiple subcarriers.

2. The method according to claim 1, wherein
the part of subcarriers comprise first subcarriers and second subcarriers; the remaining subcarriers are a result of subtracting the first subcarriers and the second subcarriers from the multiple subcarriers; at least one different subcarrier exists between the first subcarriers and the second subcarriers.

3. The method according to claim 2, wherein acquiring the data transmission errors of the data over the part of multiple subcarriers between the first communication equipment and the second communication equipment comprises:
    sending, by the first communication equipment, a notification message to the second communication equipment, wherein the notification message carries information about the part of subcarriers; and
    receiving, by the first communication equipment, the data transmission errors of the data over the part of subcarriers from the second communication equipment.

4. The method according to claim 1, wherein:
the filtering coefficients are precoding coefficients, and the step of filtering the data corresponding to the multiple subcarriers according to the filtering coefficients of the part of subcarriers and the filtering coefficients of the remaining subcarriers comprises:
    before the first communication equipment sends the data to the second communication equipment, filtering the data waiting to be sent and corresponding to the multiple subcarriers according to the precoding coefficients of the part of subcarriers and the precoding coefficients of the remaining subcarriers; and/or
the filtering coefficients are cancellation coefficients, and the step of filtering the data corresponding to the multiple subcarriers according to the filtering coefficients of the part of subcarriers and the filtering coefficients of the remaining subcarriers comprises:
    after the first communication equipment receives the data from the second communication equipment, filtering the received data corresponding to the multiple subcarriers according to the cancellation coefficients of the part of subcarriers and the cancellation coefficients of the remaining subcarriers.

5. A communication equipment, comprising:
    a first acquiring unit, configured to acquire data transmission errors of data over a part of multiple subcarriers between the communication equipment and a second communication equipment with a coefficient update formula in one of a Least Mean Square (LMS) algorithm, a linear zero forcing method, a Singular Value Decomposition (SVD) method, or a decomposition method, wherein the part of multiple subcarriers each are selected at an interval of N subcarriers; and acquire filtering coefficients of the part of subcarriers according to the data transmission errors of the data over the part of subcarriers;
    a second acquiring unit, configured to acquire filtering coefficients of remaining subcarriers according to the filtering coefficients of the part of subcarriers acquired by the first acquiring unit; and
    a filtering unit, configured to filter data corresponding to the multiple subcarriers according to the filtering coefficients of the part of subcarriers acquired by the first acquiring unit and the filtering coefficients of the remaining subcarriers acquired by the second acquiring unit; and a subcarrier selecting unit, configured to select a part of subcarriers by selecting subcarriers which are located at a motion value away from subcarriers selected in a previous update of the filtering coefficients according to a preset condition, wherein the motion value is $(\frac{1}{2}^n)*N$ and wherein N and n are integers greater than 0.

6. The communication equipment according to claim 5, further comprising:

a judging unit, configured to judge whether the filtering coefficients of the subcarriers meet a second preset condition, wherein the preset second condition is: the data over each subcarrier reaches a preset value; or, a product of the filtering coefficient and a channel H is a diagonal matrix or almost a diagonal matrix.

7. The communication equipment according to claim 5, further comprising:

a data transceiving unit, configured to: send a notification message to the second communication equipment, wherein the notification message carries information about the subcarriers selected by the subcarrier selecting unit; and receive the data transmission errors returned by the second communication equipment.

8. A communication system, comprising:

a first communication equipment, configured to:

acquire filtering coefficients of a part of multiple subcarriers according to data transmission errors of the part of subcarriers with a coefficient update formula in one of a Least Mean Square (LMS) algorithm, a linear zero forcing method, a Singular Value Decomposition (SVD) method, or a QR decomposition method, wherein the part of multiple subcarriers each are selected at an interval of N subcarriers;

acquire filtering coefficients of remaining subcarriers according to the filtering coefficients of the part of subcarriers;

filter data corresponding to the multiple subcarriers according to the filtering coefficients of the part of subcarriers and the filtering coefficients of the remaining subcarriers, wherein the remaining subcarriers are other subcarriers except the part of multiple subcarriers among all subcarriers between the first communication equipment and a second communication equipment;

determine whether the filtering coefficients corresponding to the multiple subcarriers meet a preset condition; if not, select first subcarriers which are located a motion value away from the part of subcarriers, wherein the motion value is $(\frac{1}{2}^n)*N$ and n is an integer greater than 0;

acquire the filtering coefficients of the first subcarriers according to the data transmission error of the data over the first subcarriers;

acquire, according to the filtering coefficients of the part of subcarriers and the filtering coefficients of the first subcarriers, filtering coefficients of remaining subcarriers which are a result of subtracting the first subcarriers and the part of subcarriers from all the multiple subcarriers; and filter the data corresponding to the multiple subcarriers according to the filtering coefficients of the first subcarriers and the filtering coefficients of the remaining subcarriers which are the result of subtracting the first subcarriers and the part of subcarriers from all the multiple subcarriers.

9. The system according to claim 8, wherein:

the system further comprises a second communication equipment;

the first communication equipment is further configured to select the part of subcarriers, and send a notification message to the second communication equipment, wherein the notification message carries information about the selected subcarriers; and the second communication equipment is configured to send the data transmission errors of the corresponding subcarriers to the first communication equipment according to the information about the selected subcarriers in the notification message.

* * * * *